(12) United States Patent
Haas et al.

(10) Patent No.: US 8,322,738 B2
(45) Date of Patent: Dec. 4, 2012

(54) STABILIZING STRUT FOR A CHASSIS OF A VEHICLE

(75) Inventors: Herbert Haas, Oberkirch (DE); Daniel Obert, Steinach (DE); Johannes Obrecht, Oberkirch (DE)

(73) Assignee: PROGRESS-WERK Oberkirch AG, Oberkirch (DE)

( * ) Notice: Subject to any disclaimer, the term of this patent is extended or adjusted under 35 U.S.C. 154(b) by 54 days.

(21) Appl. No.: 13/032,072

(22) Filed: Feb. 22, 2011

(65) Prior Publication Data

US 2011/0210528 A1 Sep. 1, 2011

(30) Foreign Application Priority Data

Mar. 1, 2010 (DE) .......................... 10 2010 010 665

(51) Int. Cl.
*B60G 21/05* (2006.01)
(52) U.S. Cl. ................................. 280/124.128
(58) Field of Classification Search ............. 280/93.502, 280/93.51, 124.128, 124.134, 124.135; 74/588, 74/579 R
See application file for complete search history.

(56) References Cited

U.S. PATENT DOCUMENTS

| | | | | |
|---|---|---|---|---|
| 1,885,976 A * | 11/1932 | Yandell | ............................. | 74/588 |
| 1,913,513 A * | 6/1933 | Rossman et al. | ............... | 403/152 |
| 3,193,302 A * | 7/1965 | Hill | ......................... | 280/124.128 |
| 4,369,742 A * | 1/1983 | Everts | ........................ | 123/193.6 |
| 4,480,498 A * | 11/1984 | Konig | ........................... | 74/579 R |
| 6,241,267 B1 * | 6/2001 | Dziadosz et al. | ...... | 280/124.134 |
| 7,506,444 B2 * | 3/2009 | Weise | ........................... | 29/897.2 |
| 2002/0005621 A1 * | 1/2002 | Christophliemke et al. | ..................... | 280/124.134 |
| 2004/0070129 A1 * | 4/2004 | Budde et al. | .................. | 267/188 |

FOREIGN PATENT DOCUMENTS

| | | |
|---|---|---|
| DE | 39 21 468 C1 | 5/1990 |
| DE | 100 55 859 A1 | 5/2002 |
| DE | 10 2006 051 609 A1 | 5/2008 |
| JP | 2006264560 A | 10/2006 |

\* cited by examiner

*Primary Examiner* — Paul N Dickson
*Assistant Examiner* — Robert A Coker
(74) *Attorney, Agent, or Firm* — Harness, Dickey & Pierce, P.L.C.

(57) ABSTRACT

A stabilizing strut for a chassis of a vehicle has an elongated strut body made of sheet metal which has at least one first eye at a first longitudinal end and at least one second eye at a second longitudinal end. The strut body has a curvature at least such that the strut body lies completely outside an imaginary connecting straight line between the at least one first and the at least one second eye at least in a partial region. The strut body is built up from two individual sheet metal parts which are arranged one on each side of a longitudinal center plane. The two sheet metal parts are joined to one another between the at least one first eye and the at least one second eye at their peripheral edges on a longitudinal side of the sheet metal parts oriented towards the imaginary connecting straight line, at least over a partial length of this longitudinal side of the strut body which amounts to at least 50% of the total length of this longitudinal side of the strut body. The surfaces oriented towards one another of the two sheet metal parts are spaced from one another. The peripheral edges of the sheet metal parts on the longitudinal side oriented away from the imaginary connecting straight line are not joined to one another, or at most are joined over a partial length of this longitudinal side of the strut body which amounts to not more than 50% of the total length of this longitudinal side.

13 Claims, 4 Drawing Sheets

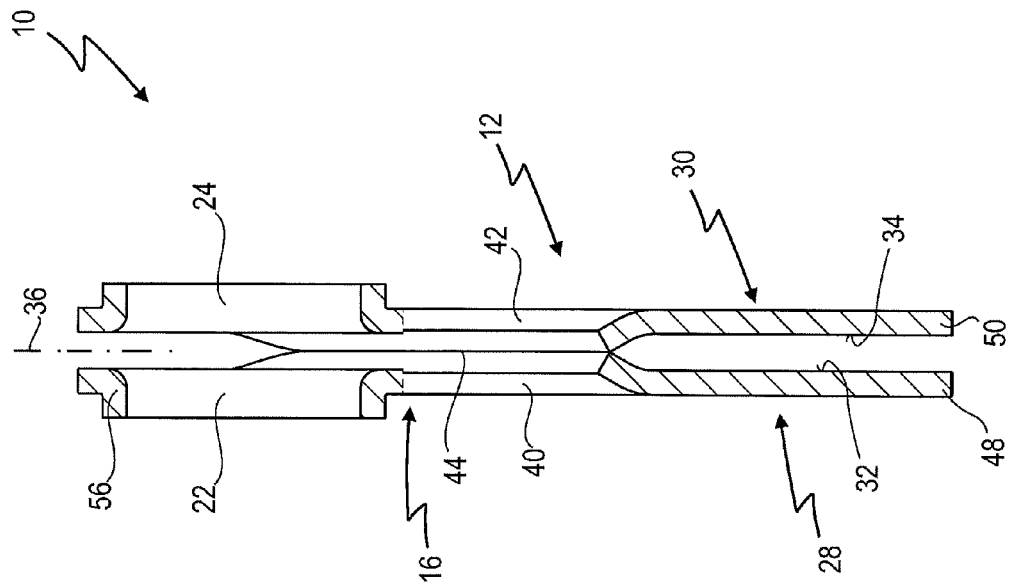
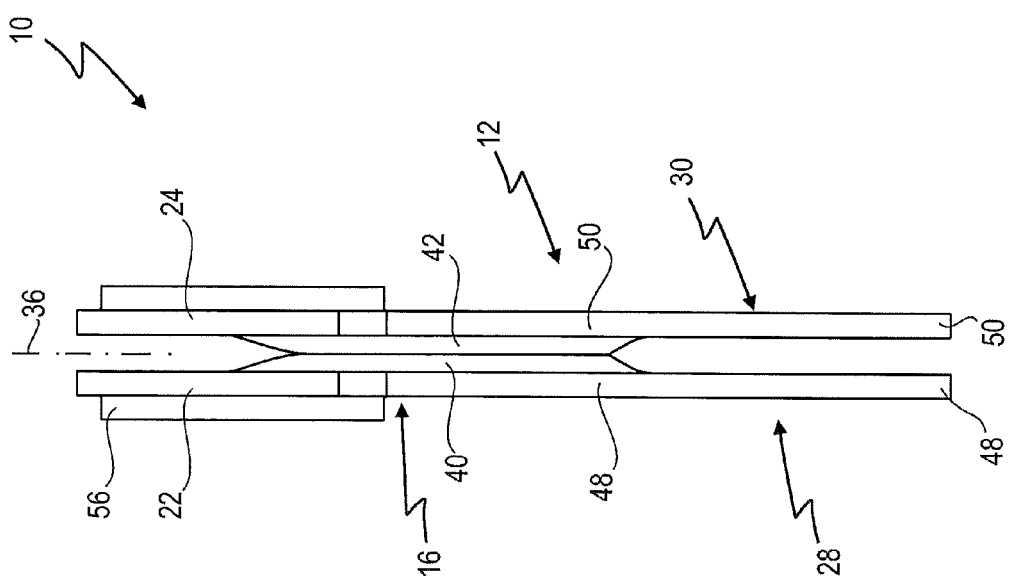

STABILIZING STRUT FOR A CHASSIS OF A VEHICLE

CROSS-REFERENCE TO RELATED APPLICATIONS

The present application claims priority to German National Application No. 10 2010 010 665.8, filed Mar. 1, 2010, the entire contents of which are incorporated herein by reference.

BACKGROUND OF THE INVENTION

The invention relates to a stabilizing strut for a chassis of a vehicle.

A stabilizing strut is used as a structural component of a chassis of a vehicle. The stabilizing strut may be, for example, a track control arm which forms part of the wheel suspension of two-track vehicles and is articulated to the body and wheel carrier of the vehicle. A stabilizing strut within the meaning of the present invention may also be a so-called Watts strut which forms part of a Watts linkage, which is used primarily in vehicles with rigid axles in order to reduce lateral movements of the rigid axle.

However, a stabilizing strut according to the invention is not restricted to these applications.

In general, the stabilizing strut for a chassis of a vehicle on which the invention is based has an elongated strut body made of sheet metal which has at least one first eye at a first longitudinal end and at least one second eye at a second longitudinal end. The eyes serve as bearing eyes for attaching the stabilizing strut, for example, to the body at one end and to the wheel carrier at the other end. A component such as an elastic bearing may be received in at least one of the end eyes.

The stabilizing strut according to the invention has, in particular, a strut body having a curvature at least such that the strut body lies completely outside an imaginary connecting straight line between the at least one first and the at least one second eye in at least a partial region of its length. Such a curved configuration of the strut body may be determined by the installation situation of the stabilizing strut in a vehicle, for example if a further chassis component, around which the strut body must pass, is arranged on the connecting straight line between the eyes.

The requirements of high stiffness, high resistance to buckling, capacity to transmit large forces and, in addition, simple, low-cost manufacturability, are generally placed on a stabilizing strut for a chassis of a vehicle.

Stabilizing struts which are produced in one piece, that is, from a single metal sheet, are known. In this case a sheet metal blank, usually a sheet steel blank, is subjected to a plurality of forming processes in order to obtain, for example, a U-shaped profile in cross section, the peripheral edges of the sheet metal additionally being flanged or bent over in order to increase stiffness. There are also known stabilizing struts of one-piece construction in which the sheet metal is formed to such an extent that the strut body has an almost closed box-shaped profile in cross section perpendicularly to the longitudinal direction.

The disadvantage of the one-piece construction of stabilizing struts is that, because of the plurality of forming processes to which the sheet metal blank is subjected, a sheet metal blank of low sheet thickness made of a material of low strength must be used, which, however, reduces the inherent stiffness of the stabilizing strut produced in this way. In other words, only relatively soft sheet metal can be used for such a stabilizing strut, in order to make possible the complex forming processes without rupture or fracture of the material. If, in addition, the strut body has a large curvature, the aforementioned forming processes can be implemented only with a still softer starting material, still further reducing the inherent stiffness of the stabilizing strut produced in this way.

If the sheet metal is formed to such an extent that the strut body has an almost closed box-shaped profile in cross section perpendicularly to the longitudinal direction, the inherent stiffness of the stabilizing strut can thereby be increased; however, the internal surfaces of the closed box-shaped profile are no longer accessible for subsequent coating or painting.

Stabilizing struts which are likewise produced from a sheet metal which is not only formed by bending and folding processes but is deep-drawn in order to produce the strut body are also known. The manufacture of a stabilizing strut of one-piece construction by means of numerous forming processes with a high degree of forming, whether by folding, bending, deep-drawing or the like, has the disadvantage of high tooling costs, with the result that the production of the stabilizing strut is cost-intensive. In addition, the time requirement for producing the stabilizing strut is disadvantageously high, which also contributes to increased cost.

Stabilizing struts which have a two-part construction are also known. In the case of these known stabilizing struts two sheet metal parts forming the strut body are joined to one another at their peripheral edges over their entire length by means of continuous weld seams. The disadvantage of this construction is that the cost and complexity of production are increased by the joining of the peripheral edges of the sheet metal parts over their entire length. A further disadvantage is that, viewed in cross section, the strut body has a closed profile over almost its entire length, making it impossible or at least more difficult to paint or coat the internal surfaces of the strut body subsequently, in order to protect the interior of the stabilizing strut from corrosion.

SUMMARY OF THE INVENTION

It is the object of the invention to specify a stabilizing strut for a chassis of a vehicle which meets the requirements of high force-transmitting capacity while nevertheless being manufacturable at low cost.

This object is achieved according to the invention by a stabilizing strut for a chassis of a vehicle, comprising an elongated strut body made of sheet metal which has at least one first eye at a first longitudinal end and at least one second eye at a second longitudinal end and which has a curvature at least such that, at least in a partial region, the strut body lies completely outside an imaginary connecting straight line between the at least one first and the at least one second eye, the strut body being built up from two individual sheet metal parts which are arranged one on each side of a longitudinal centre plane, the two sheet metal parts being joined to one another at their peripheral edges between the at least one first eye and the at least one second eye on a longitudinal side of the sheet metal parts which is oriented towards the imaginary connecting straight line, at least over a partial length of this longitudinal side of the strut body, which partial length amounts to at least 50% of the total length of this longitudinal side of the strut body, the surfaces oriented towards one another of the two sheet metal parts being spaced from one another and the peripheral edges of the sheet metal parts not being joined to one another on the longitudinal side oriented away from the imaginary connecting straight line, or being joined at most over a partial length of this longitudinal side of the strut body which amounts to not more than 50% of the total length of this longitudinal side.

The stabilizing strut according to the invention is therefore based on a two-part construction. In contrast to the known stabilizing struts of two-part construction, however, the two sheet metal parts are joined to one another at their peripheral edges only on one longitudinal side of the strut body, and specifically on the longitudinal side of the strut body which, with respect to the curvature, is the inner side or the concave side of the strut body. In the stabilizing strut according to the invention, therefore, the two sheet metal parts are connected in the region of the greatest stresses. In addition, a high resistance to buckling is achieved through the spacing of the sheet metal parts. On the opposite outer side, by contrast, the two sheet metal parts are not joined to one another or, at most, individual local joint sites may be provided on that side, so that the strut body is open on that side.

Because the surfaces of the sheet metal parts oriented towards one another are spaced from one another, the strut body of the stabilizing strut according to the invention has a substantially U-shaped profile in cross section, at least in the region of the curvature, which profile is therefore open on one side. Unlike the one-piece stabilizing struts with a U-shaped cross-section, however, the stabilizing strut according to the invention has the advantage that the individual sheet metal parts do not need to be subjected to forming, or at most to an extremely small amount of forming, so that, firstly, a high-strength steel can be used for the sheet metal parts and, secondly, the thickness of the sheet metal can be significantly greater than with the one-piece construction. This yields the further advantage that the stabilizing strut according to the invention has very high inherent stiffness and can transmit large forces, or that, for a given force, significantly smaller stresses are produced in the stabilizing strut than in the known stabilizing strut. Moreover, the stabilizing strut according to the invention can be produced at significantly lower cost since, with regard to tooling costs, extensive forming processes are avoided.

The construction according to the invention is also advantageous with regard to the pronounced curvature of the strut body to be produced, since the two sheet metal parts can be punched as punching parts already having the predetermined curvature, which is not possible with the one-piece construction.

On the longitudinal side of the sheet metal parts which is oriented towards the imaginary connecting straight line, the two sheet metal parts may also be joined to one another over the entire length of this longitudinal side of the strut body or, expressed differently, over a length amounting to 50% to 100% of the total length of this longitudinal side, depending on the requirements placed on the stabilizing strut with regard to stiffness and force transmission. On the opposite longitudinal side the sheet metal parts are preferably not joined to one another, or are joined only by individual joint sites or joining points, in order to achieve a degree of openness as large as possible of the strut body on this longitudinal side.

As a result of the open profile of the stabilizing strut according to the invention on one side, the internal surfaces of the stabilizing strut can be coated or painted also after the two sheet metal parts have been joined; in particular, the stabilizing strut according to the invention can be dip-painted, so that the stabilizing strut according to the invention can be well protected against corrosion.

In a refinement, the peripheral edges of the sheet metal parts on the longitudinal side which is oriented away from the imaginary connecting straight line are joined at most over a partial length of this longitudinal side of the strut body which amounts to not more than 30% of the total length of this longitudinal side.

In a preferred refinement, the peripheral edges of the sheet metal parts on the longitudinal side oriented towards the connecting straight line are bent over towards one another and butt-joined or edge-joined to one another.

The bending over of the peripheral edges represents only a small forming process in which, in particular, the peripheral edges do not need to be bent through 90° from the main plane of the sheet metal parts; it is sufficient to bend the peripheral edges only so far that the peripheral edges touch one another at an edge at which they are then joined.

In a further preferred refinement, the peripheral edges of the sheet metal parts on the longitudinal side oriented towards the connecting straight line are bent towards one another through less than 90° and joined to one another edge-to-edge.

If the edge-bend of the peripheral edges is less than 90°, a very high-strength material can be used for the sheet metal parts, which is not straightforwardly possible with an edge-bend of 90°. The manufacture of the two sheet metal parts is also simplified by this measure. Furthermore, this measure has the advantage that after the bending of the peripheral edges a high degree of edge accuracy is not required, since inaccuracies are filled by the joining material, especially if, as described below, the peripheral edges are joined to one another by welding. With an appropriate welding method a complete and gap-free joint of the peripheral edges is achieved. Any cracks in the material or stress-critical notches on the cut edges are simply closed by welding.

As distinct from a refinement in which the peripheral edges overlap one another at the joint sites, the aforementioned measure also has the advantage that corrosion due to lack of material overlap is more easily avoided.

In this connection it is preferred if the peripheral edges of the sheet metal parts are joined to one another by welding on the longitudinal side oriented towards the connecting straight line.

Joining of the two sheet metal parts by welding them to one another is cost-effective.

The weld seam is preferably located on the axis of symmetry of the two sheet metal parts, that is, in the longitudinal centre plane. Preferably, use is made of a welding material which has higher strength than the base material of the two sheet metal parts. With an appropriate welding process a complete and gap-free attachment of the two sheet metal parts at the peripheral edges on the axis of symmetry is achieved, in particular in conjunction with the aforementioned configuration according to which the peripheral edges of the sheet metal parts are joined edge-to-edge. As a result of the symmetrical geometry of the strut body obtained thereby the resistance to buckling of the stabilizing strut is advantageously increased, whereby the spacing of the two sheet metal parts can even be kept small while nevertheless obtaining high inherent stiffness of the stabilizing strut.

In a further preferred refinement, the peripheral edges of the sheet metal parts are spaced from one another on the longitudinal side oriented away from the connecting straight line, by an amount corresponding to the spacing of the surfaces of the sheet metal parts oriented towards one another.

In this case it is advantageous that the peripheral edges of the sheet metal parts which are oriented away from the connecting straight line do not need to be subjected to forming, whereby further cost is saved in producing the stabilizing strut. Moreover, the internal surfaces of the stabilizing strut are very easily accessible for painting or coating even after the two sheet metal parts have been joined to one another.

In a further preferred configuration, the one sheet metal part has the first eye at its one longitudinal end and the second eye at its other longitudinal end, the first eye and the second eye each having a respective flange which is formed from the sheet metal part by forming, in particular by one draw.

This forming process also involves only a small degree of forming, since the eye flanges can be formed from the respective sheet metal parts by one draw. The eye flanges can therefore be implemented at very low cost.

In this case it is further preferred if the other sheet metal part has a third eye at its one longitudinal end and a fourth eye at its other longitudinal end, the first and third eyes on the one hand the fourth eye on the other being aligned with one another, and the third eye and the fourth eye each having an eye flange which is formed from the sheet metal part by reshaping, in particular by one draw.

Through the provision of an eye at both ends of each sheet metal part, a double eye is produced at each sheet metal end of the strut body, whereby the force-transmitting capacity of the stabilizing strut according to the invention is further improved.

In a further preferred refinement at least one of the sheet metal parts has one or more openings in the material.

This measure has, firstly, the advantage of saving weight and material and, secondly, the advantage of still further improving the accessibility of the interior of the strut body for subsequent painting, in particular dip-painting, or coating.

In a further preferred refinement the sheet metal parts have a material thickness which is in the range from approximately 2 mm to approximately 6 mm, preferably in the range from approximately 3 mm to approximately 5 mm.

As mentioned above, because of the construction of the stabilizing strut according to the invention use can be made of sheet metal parts with a significantly greater material thickness than with the one-piece constructions, which require a significantly lower sheet metal thickness because of the forming processes with high degrees of forming. In addition, a higher-strength steel can be used for the stabilizing strut according to the invention.

Further advantages and features are apparent from the following description and from the appended drawing.

Self-evidently, the features mentioned hereinbefore and to be explained hereinafter can be used not only in the combination specified in each case but also in other combinations or in isolation, without departing from the scope of the present invention.

BRIEF DESCRIPTION OF THE DRAWINGS

An exemplary embodiment of the invention is represented in the drawing and is described in more detail below in relation to this drawing, in which:

FIG. 4 shows the stabilizing strut in FIG. 1 in an end view of the right-hand end of the stabilizing strut in FIG. 1, and FIG. 5 shows the stabilizing strut in FIG. 1 in a section along the line V-V in FIG. 2.

DETAILED DESCRIPTION OF A PREFERRED EXEMPLARY EMBODIMENT

Figure 1:
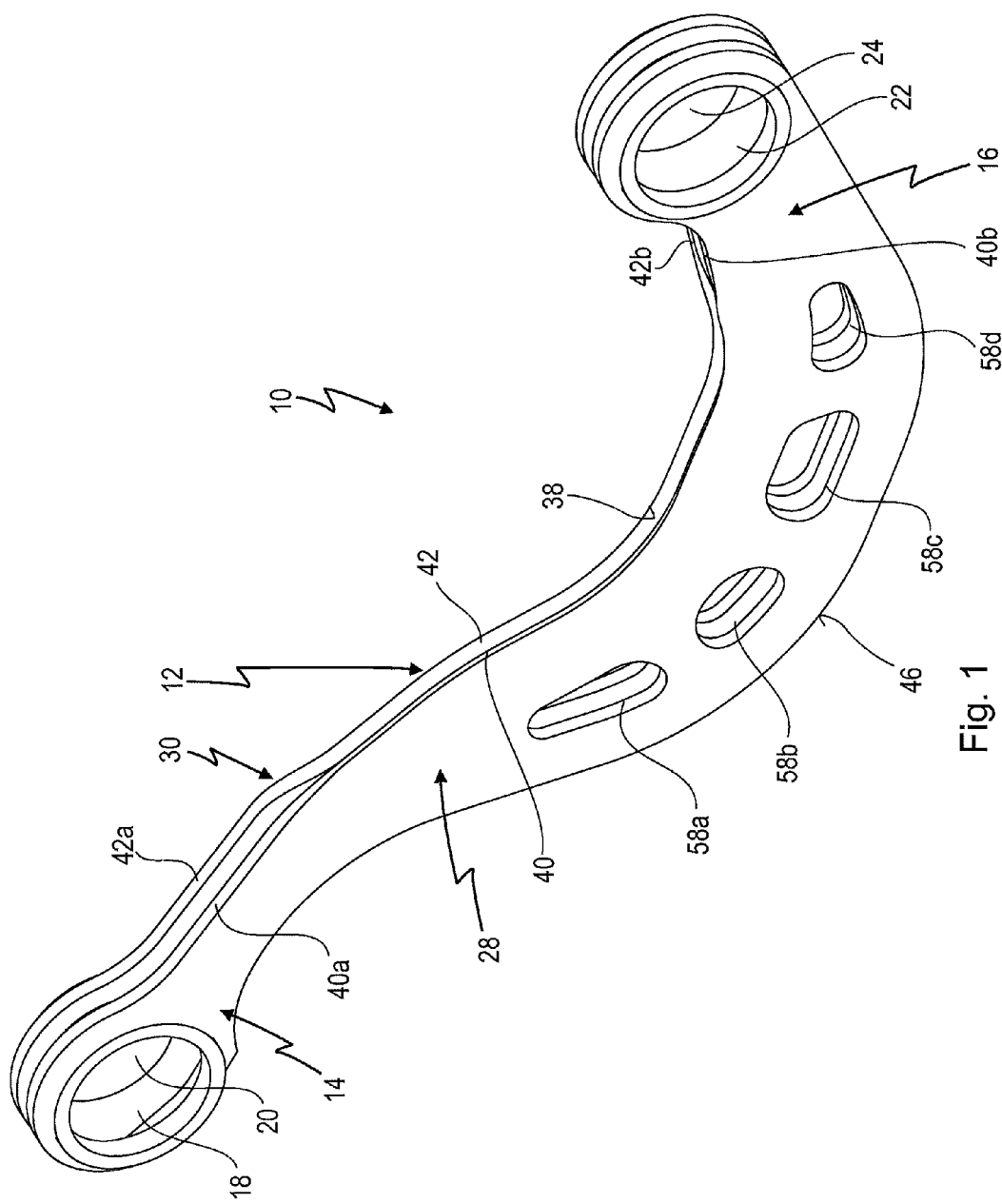
FIG. 1 shows a stabilizing strut according to the invention in a perspective view.

FIGS. 1 to 5 show a stabilizing strut according to the invention for a chassis of a vehicle in different views.

The stabilizing strut 10 comprises an elongated strut body 12 made of sheet metal, which has a first longitudinal end 14 and a second longitudinal end 16. At the first longitudinal end 14 the strut body 12 has two eyes 18 and 20, the openings of which are aligned with one another. At the second longitudinal end 16 the strut body 12 has two eyes 22 and 24 which are also aligned with one another.

Figure 2:
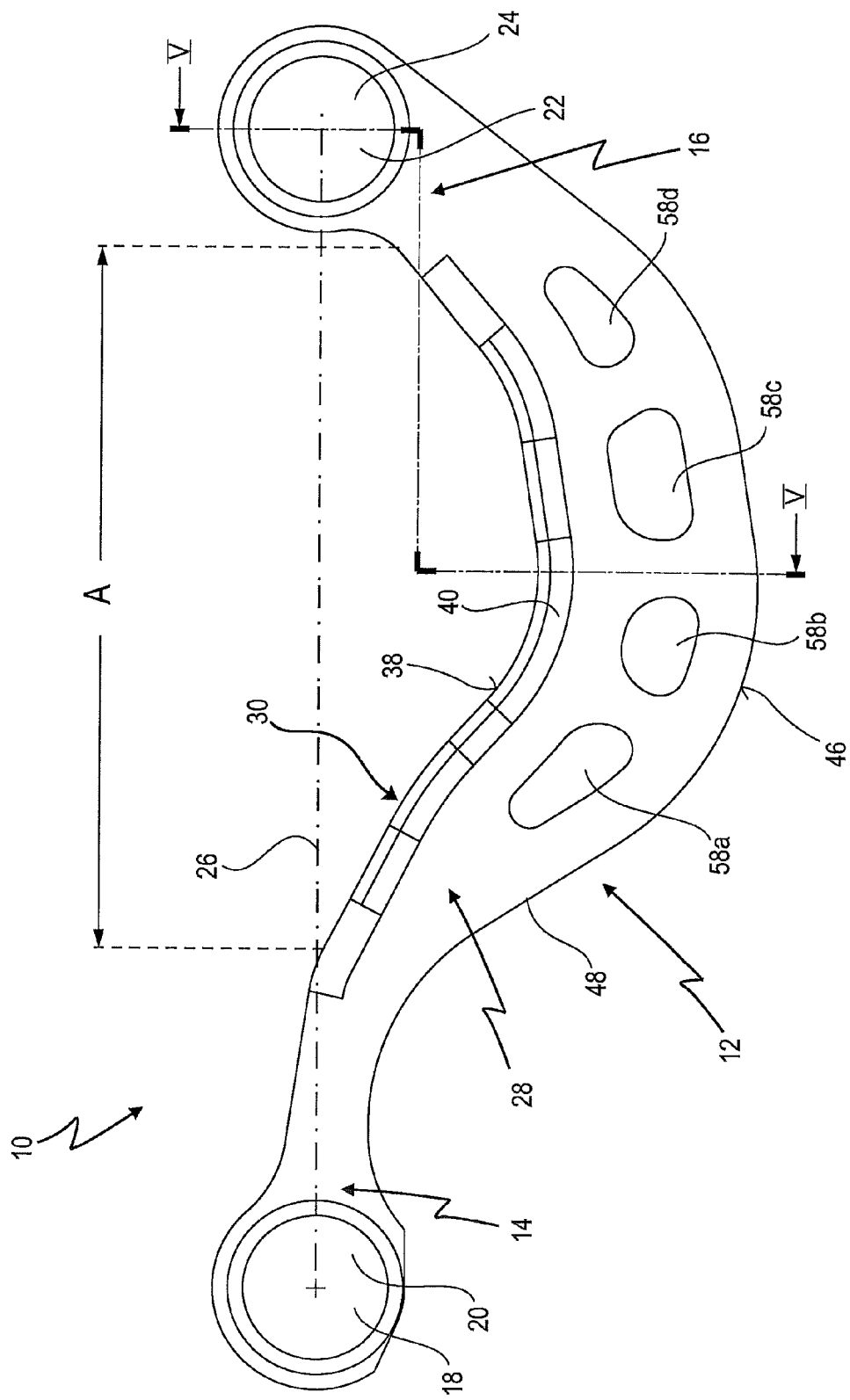
FIG. 2 shows the stabilizing strut in FIG. 1 in a side view.

In FIG. 2 an imaginary connecting straight line 26 between the eyes 18 and 20 on the one hand and the eyes 22 and 24 on the other is represented. As is apparent in particular from FIG. 2, the strut body 12 has a curvature such that the strut body lies completely outside the imaginary connecting straight line 26 at least in a partial region A.

Figure 3:
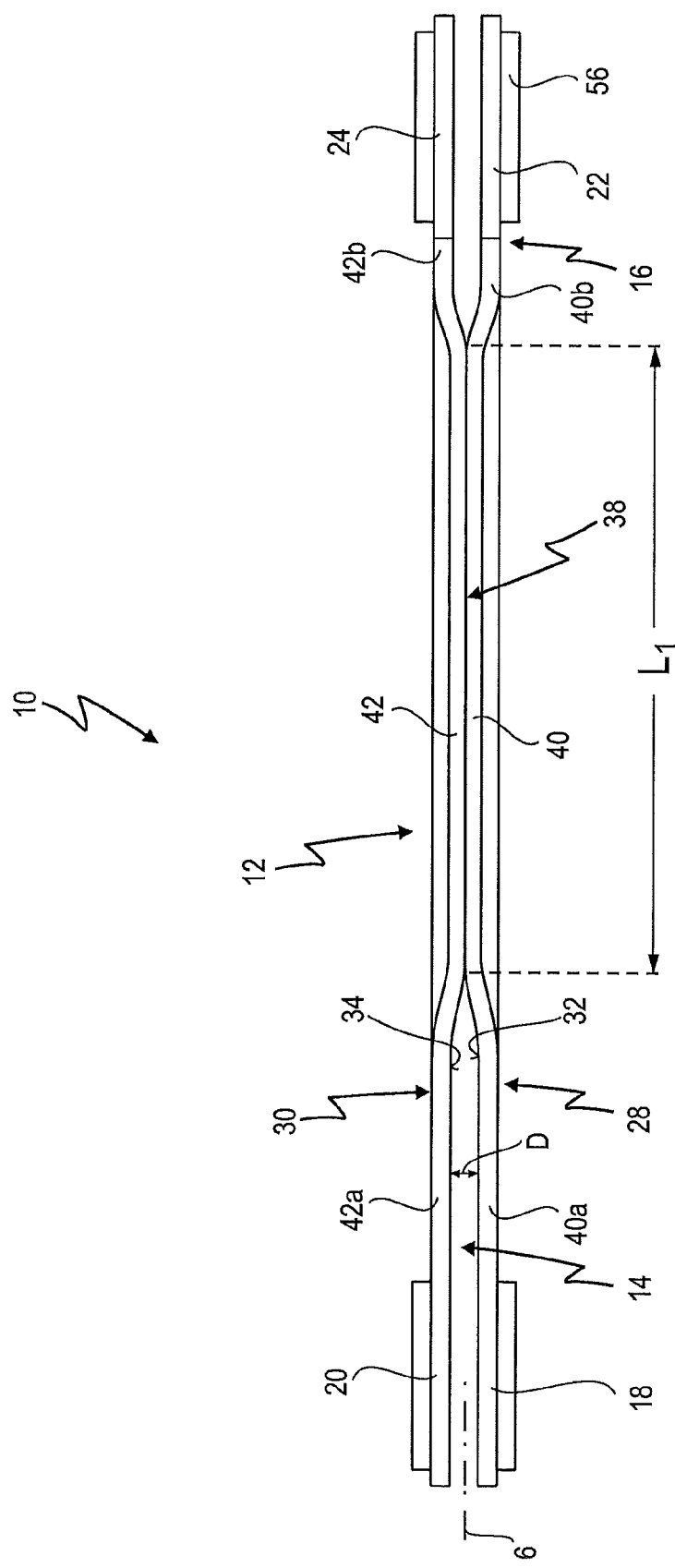
FIG. 3 shows the stabilizing strut in FIG. 1 in a top view.

As shown in FIG. 3, the strut body 12 is built up from two sheet metal parts 28 and 30, the surfaces 32 and 34 of which oriented towards one another are arranged one on each side of a longitudinal centre plane 36 which runs parallel to the connecting straight line 26. On a longitudinal side 38 oriented towards the connecting straight line 26 (the inner side with respect to the curvature), the two sheet metal parts 28 and 30 have respective peripheral edges 40 and 42, the peripheral edge 40 of the sheet metal part 28 being joined to the peripheral edge 42 of the sheet metal part 30. In this case the peripheral edges 40 and 42 are joined to one another over at least a partial length $L_1$ of the strut body 12 which amounts to at least 50% of the total length of this longitudinal side 38 between the first longitudinal end 14 and the second longitudinal end 16 of the strut body 12.

As shown in FIG. 5, the peripheral edges 40 and 42 are bent over towards one another by a small amount, but at least by less than 90°, in their region corresponding to the partial length $L_1$, so that, in the region corresponding to the partial length $L_1$, the peripheral edges 40 and 42 contact one another at an edge 44 along which the peripheral edges 40 and 42 are joined. In this case the joining of the peripheral edges 40 and 42 is effected by welding. The weld seam is located on the axis the symmetry, that is, in the longitudinal centre plane 36 of the strut body 12, as a result of which the stabilizing strut 10 offers high resistance to buckling. As the welding material, a material which has higher strength than the material of the sheet metal parts 28, 30 is preferably used.

In regions outside that of the partial length $L_1$, the peripheral edges 42 and 40 are not bent over from the respective sheet metal plane, as is shown with the peripheral edge of regions 40a, 40b and 42a and 42b.

As shown in FIG. 3, the sheet metal parts 28 and 30, more precisely the surfaces 32 and 34 oriented towards one another, are spaced from one another by a distance D.

On a longitudinal side 46 (the outer side with respect to the curvature) of the strut body 12 which is oriented away from the connecting straight line 26, the sheet metal part 28 has a peripheral edge 48 and the sheet metal part 30 a peripheral edge 50, the sheet metal parts 28 and 30 preferably not being joined to one another at the peripheral edges 48 and 50, so that the profile of the strut body 12 formed by the two sheet metal parts 28 and 30 is open on the longitudinal side 46. However, it is also possible to join the peripheral edges 48 and 50 locally to one another (at joining points or sites) on the longitudinal side 46, any joining points or sites on the longitudinal side 46 of the strut body 12 extending in total over not more than a partial length of the longitudinal side 46 of the strut body 12 which amounts to not more than 50%, or not more than 30% of the total length of the longitudinal side 46.

As is apparent from FIG. 5, the strut body 12, viewed in cross section, therefore has substantially a U-shaped profile in the region in which the peripheral edges 40 and 42 are joined to one another, so that the surfaces 32 and 34 oriented towards one another of the strut body 12 are accessible for coating and painting even after the two sheet metal parts 28 and 30 have been joined to one another. After the joining of the sheet metal parts 28 and 30 to one another, therefore, the stabilizing strut 10 can be subjected, in particular, to a dip-painting process.

In the exemplary embodiment shown here, the sheet metal part 28 has the eyes 18 and 22 and the sheet metal part 30 the eyes 20 and 24.

Each of the eyes 18, 20, 22 and 24 has an eye flange, as is shown for an eye flange 56 of the eye 22 in FIGS. 3 and 5. The eye flange 56 was formed integrally by forming of the sheet metal 28 before the sheet metal parts 28 and 30 were joined to one another, a single draw of a deep-drawing process being sufficient for this purpose.

The same applies to the other eye flanges.

The only forming processes to which the sheet metal parts 28 and 30 are subjected are therefore the slight bending over of the peripheral edges 40 and 42 and the integral forming of the eye flanges 56.

Otherwise, the sheet metal parts 28 and 30 are flat in the drawing plane of FIG. 2 and therefore can be made available as simple punching parts, which can be punched from a blank while already having the curved outer contours.

Both sheet metal parts 28 and 30 are provided with a plurality of openings or apertures 58*a*, 58*b*, 58*c*, 58*d* in the material, in order further to reduce the weight of the stabilizing strut 10.

Because of the small amount of forming of the two sheet metal parts 28 and 30, the sheet metal parts 28 and 30 can be produced from sheet metal with a thickness in the range from approximately 2 mm to approximately 6 mm, preferably in the range from approximately 3 mm to approximately 5 mm, and from a higher-strength steel.

What is claimed is:

1. A stabilizing strut for a chassis of a vehicle, comprising:
    an elongated strut body made of sheet metal and having a first longitudinal end and a second longitudinal end,
    at least one first eye being arranged at said first longitudinal end and at least one second eye being arranged at said second longitudinal end,
    said strut body having a curvature at least such that, at least in a partial region, said strut body lies completely outside an imaginary connecting straight line between said at least one first and said at least one second eye,
    said strut body being built up from two individual sheet metal parts arranged one on each side of a longitudinal center plane, said two sheet metal parts having surfaces oriented towards one another, said surfaces being spaced from one another,
    said two sheet metal parts having peripheral edges between said at least one first eye and said at least one second eye, said two sheet metal parts being joined to one another at said peripheral edges on a first longitudinal side of said sheet metal part, which is oriented towards said imaginary connecting straight line, at least over a partial length of said first longitudinal side of said strut body, said partial length amounts to at least 50% of a total length of said first longitudinal side of said strut body,
    said two sheet metal parts not being joined to one another on a second longitudinal side of said strut body, which is oriented away from said imaginary connecting straight line, or being joined on said second longitudinal side at most over a partial length of said second longitudinal side of said strut body which amounts to not more than 50% of a total length of said second longitudinal side.

2. The stabilizing strut of claim 1, wherein said two sheet metal parts are joined on said second longitudinal side at most over a partial length of said second longitudinal side of said strut body which amounts to not more than 30% of said total length of said second longitudinal side.

3. The stabilizing strut of claim 1, wherein said peripheral edges of said two sheet metal parts on said first longitudinal side oriented towards said connecting straight line are bent towards one another and are butt-joined to one another.

4. The stabilizing strut of claim 3, wherein said peripheral edges of said two sheet metal parts on said first longitudinal side oriented towards said connecting straight line are joined to one another by welding.

5. The stabilizing strut of claim 1, wherein said peripheral edges of said two sheet metal parts on said first longitudinal side oriented towards said connecting straight line are bent towards one another and are edge-joined to one another.

6. The stabilizing strut of claim 5, wherein said peripheral edges of said two sheet metal parts on said first longitudinal side oriented towards said connecting straight line are bent towards one another through less than 90° in each case and are joined to one another edge-to-edge.

7. The stabilizing strut of claim 6, wherein said peripheral edges of said two sheet metal parts on said first longitudinal side oriented towards said connecting straight line are joined to one another by welding.

8. The stabilizing strut of claim 1, wherein said peripheral edges of said two sheet metal parts on said second longitudinal side oriented away from said connecting straight line are spaced from one another by an amount corresponding to a distance between said surfaces oriented towards one another of said two sheet metal parts.

9. The stabilizing strut of claim 1, wherein one of said two sheet metal parts has said first eye at said first longitudinal end and said second eye at said second longitudinal end, said first eye and said second eye each having an eye flange which is formed from said sheet metal part by forming.

10. The stabilizing strut of claim 9, wherein the other of said two sheet metal parts has a third eye at said first longitudinal end and a fourth eye at said second longitudinal end, said first and said third eyes on the one hand and said second and said fourth eyes on the other hand being aligned with one another and said third eye and said fourth eye each having an eye flange which is formed from said sheet metal part by forming.

11. The stabilizing strut of claim 1, wherein at least one of said two sheet metal parts has at least one opening.

12. The stabilizing strut of claim 1, wherein said two sheet metal parts have a material thickness which is in a range from approximately 2 mm to approximately 6 mm.

13. The stabilizing strut of claim 1, wherein said two sheet metal parts have a material thickness which is in a range from approximately 3 mm to approximately 5 mm.

* * * * *